US009374443B2

(12) United States Patent
Govindappa et al.

(10) Patent No.: US 9,374,443 B2
(45) Date of Patent: Jun. 21, 2016

(54) METHOD AND APPARATUS FOR EFFICIENT PACKET COMPRESSION

(71) Applicant: QUALCOMM Incorporated, San Diego, CA (US)

(72) Inventors: Sumanth Govindappa, San Diego, CA (US); Venkata Ramanan Venkatachalam Jayaraman, Del Mar, CA (US); Rohit Kapoor, San Diego, CA (US); Murtuza Taheri Chhatriwala, San Diego, CA (US); Pamela Ann Cereck, San Diego, CA (US); Swarup Nagaraj Dwaral, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/258,893

(22) Filed: Apr. 22, 2014

(65) Prior Publication Data
US 2015/0016475 A1 Jan. 15, 2015

Related U.S. Application Data

(60) Provisional application No. 61/845,310, filed on Jul. 11, 2013, provisional application No. 61/887,795, filed on Oct. 7, 2013.

(51) Int. Cl.
*H04L 29/06* (2006.01)
*H04W 28/06* (2009.01)

(52) U.S. Cl.
CPC ............ *H04L 69/22* (2013.01); *H04L 29/0604* (2013.01); *H04L 69/04* (2013.01); *H04W 28/06* (2013.01)

(58) Field of Classification Search
None
See application file for complete search history.

(56) References Cited

U.S. PATENT DOCUMENTS

| 6,608,841 B1 * | 8/2003 | Koodli | H04L 29/06 341/60 |
| 6,751,209 B1 * | 6/2004 | Hamiti | H04L 29/06 370/349 |
| 2002/0059464 A1 * | 5/2002 | Hata | H04L 1/0001 709/247 |

(Continued)

FOREIGN PATENT DOCUMENTS

EP    1 928 130 A2    6/2008
WO    WO-2012/175132 A1    12/2012

OTHER PUBLICATIONS

Bormann et al. RFC 3095 RObust Header Compression (ROHC): Framework and four profiles: RTP, UDP, ESP, and uncompresswed, Jul. 2001.*
Sandlund P. K., et al., "The Robust Header Compression (ROHC) Framework; rfc5795.txt", The Robust Header Compression (ROHC) Framework; RFC5795.TXT, Internet Engineering Task Force, IETF; Standard, Internet Society (ISOC) 4, Rue Des Falaises CH-1205 Geneva, Switzerland, XP015068232, Mar. 19, 2010, pp. 1-41.

(Continued)

*Primary Examiner* — Gary Mui
(74) *Attorney, Agent, or Firm* — Arent Fox LLP

(57) ABSTRACT

Methods and apparatus are described for reordering a header of a transmission data packet. The methods and apparatus include identifying one or more static fields and one or more dynamic fields within a header of the transmission data packet. Moreover, these aspects include reordering the one or more static fields and the one or more dynamic fields within the header of the transmission data packet. Additionally, these aspects include compressing the header of the transmission data packet to form a compressed transmission data packet in response to reordering the one or more static fields and the one or more dynamic fields. The aspects also may include transmitting the compressed transmission data packet.

18 Claims, 17 Drawing Sheets

(56) References Cited

U.S. PATENT DOCUMENTS

| | | | |
|---|---|---|---|
| 2007/0058679 A1* | 3/2007 | Pelletier | H04W 28/06 370/477 |
| 2007/0211724 A1* | 9/2007 | Johansson | H04L 49/00 370/392 |
| 2008/0080559 A1 | 4/2008 | Singh | |
| 2010/0098109 A1* | 4/2010 | Le Pennec | H03M 7/3066 370/477 |
| 2013/0022032 A1 | 1/2013 | Taghavi et al. | |
| 2013/0064177 A1* | 3/2013 | Venkatachalam | H04W 80/00 370/328 |
| 2015/0085835 A1 | 3/2015 | Eravelli et al. | |

OTHER PUBLICATIONS

Pelletier S. G., et al., "Robust Header Compression (ROHC): A Profile for TCP/IP (ROHC-TCP); rfc4996.txt", 20070701, XP015052530, ISSN: 0000-0003, Jul. 1, 2007, p. 1-94.

International Preliminary Report on Patentability dated Jun. 25, 2015 issued in International Patent Application No. PCT/US2014/045640. (18 total pages).

International Search Report and Written Opinion—PCT/US2014/045640—ISA/EPO—Oct. 16, 2014. (12 total pages).

\* cited by examiner

METHOD AND APPARATUS FOR EFFICIENT PACKET COMPRESSION

CLAIM OF PRIORITY UNDER 35 U.S.C §119

The present Application for Patent claims priority to U.S. Provisional Application No. 61/845,310 entitled "METHOD AND APPARATUS FOR REORDERING A HEADER FOR EFFICIENT PACKET COMPRESSION" filed Jul. 11, 2013, Qualcomm Ref. No. 133945P1, and U.S. Provisional Application No. 61/887,795 entitled "METHODS AND APPARATUS FOR UPLINK DATA COMPRESSION USING HEADER-ONLY COMPRESSION AND OUT-OF-SYNC DETECTION" filed Oct. 7, 2013, Qualcomm Ref. No. 140129P1, both assigned to the assignee hereof and both hereby expressly incorporated by reference.

BACKGROUND

Aspects of the present disclosure relate generally to telecommunication systems, and more particularly, to an apparatus and method for a telecommunication system with a memory based packet coding for reordering a header for efficient packet compression, thereby providing consistent service in a wireless communication system.

Wireless and wire-line communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications in multimode devices.

However, in some multimode devices, packet data traffic between a mobile user equipment (UE) and a corresponding access network may not always be encoded in a format that minimizes the transmission packet size.

Moreover, in conventional systems, it may be difficult to compress only the headers of a data packet without parsing the entire packet to determine where, within the data packet, the header ends.

Thus, improvements in transmitting data packets within a wireless communication system are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for reordering a header of a transmission data packet comprises identifying one or more static fields and one or more dynamic fields within a header of the transmission data packet. Moreover, the method includes reordering the one or more static fields and the one or more dynamic fields within the header of the transmission data packet. Additionally, the method includes compressing the header of the transmission data packet to form a compressed transmission data packet after the reordering of the one or more static fields and the one or more dynamic fields. The method includes transmitting the compressed transmission data packet.

Further aspects provide a computer program product for reordering a header of a transmission data packet comprising at least one instruction executable to cause a computer to identify one or more static fields and one or more dynamic fields within a header of the transmission data packet. Further, the computer program product further comprises at least one instruction executable to cause the computer to reorder the one or more static fields and the one or more dynamic fields within the header of the transmission data packet. Moreover, the computer program product further comprises at least one instruction executable to cause the computer to compress the transmission data packet to form a compressed transmission data packet after the reordering of the one or more static fields and the one or more dynamic fields. Additionally, the computer program product further comprises at least one instruction executable to cause the computer to transmit the compressed transmission data packet.

Additional aspects provide an apparatus for reordering a header of a transmission data packet comprises means for identifying one or more static fields and one or more dynamic fields within a header of the transmission data packet. Moreover, the apparatus includes a means for reordering the one or more static fields and the one or more dynamic fields within the header of the transmission data packet. Additionally, the apparatus includes means for compressing the header of the transmission data packet to form a compressed transmission data packet after the reordering of the one or more static fields and the one or more dynamic fields. The apparatus includes means for transmitting the compressed transmission data packet.

In an additional aspect, an apparatus for communication comprises a memory storing executable instructions and a processor in communication with the memory, wherein the processor is configured to execute the instructions to identify one or more static fields and one or more dynamic fields within a header of the transmission data packet. Further, the processor is configured to reorder the one or more static fields and the one or more dynamic fields within the header of the transmission data packet. Moreover, the processor is configured to compress the transmission data packet to form a compressed transmission data packet after the reordering of the one or more static fields and the one or more dynamic fields. Additionally, the processor is configured to transmit the compressed transmission data packet.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

DETAILED DESCRIPTION

Figure 1:
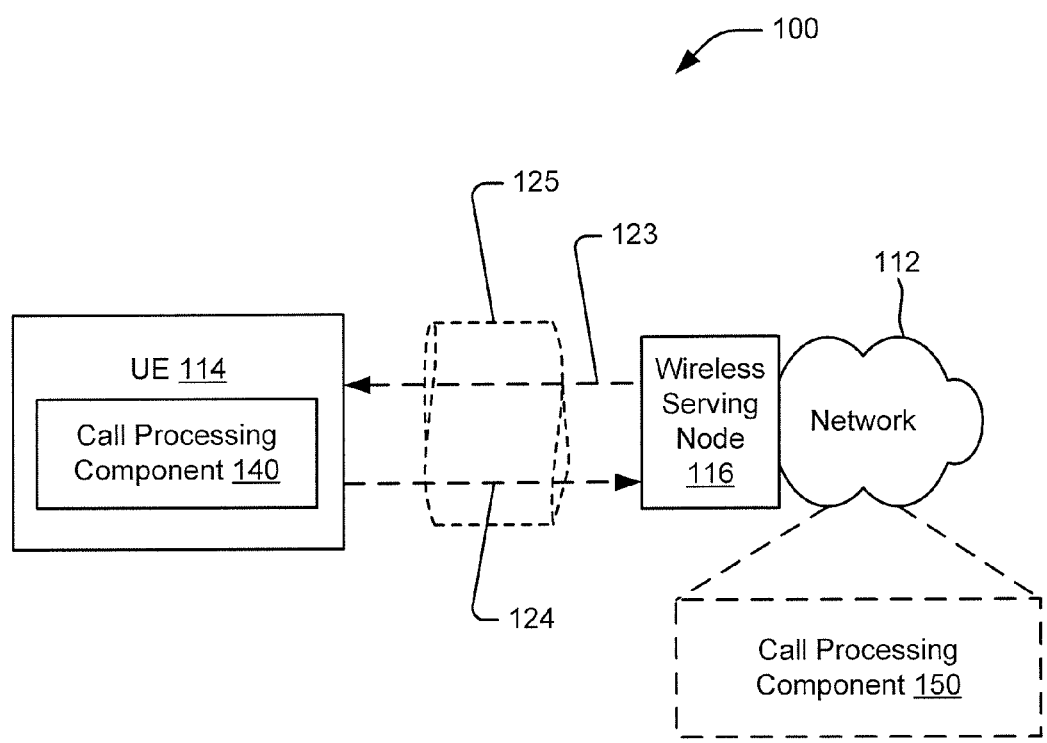
FIG. 1 is a schematic diagram illustrating an example wireless system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As discussed above, a mechanism to increase the compression gains by reordering the headers is provided. These aspects identify the fields in the headers as being either static fields or dynamic fields. Static fields are fields that have a high probability of not changing across packets, and dynamic fields are fields that have a high probability of changing across packets. For example, in once instance, fields may be determined to be either static or dynamic based on if the chance that a field changes is greater than a certain percentage threshold (e.g., a dynamic field has a greater than 50% chance of changing across packets while a static field has a less than 50% change of changing across packets). Moreover, in another instance, static and dynamic fields may be identified based on preconfigured settings or UE/network configurations or indications transmitted to/from a UE/network. As such, at the compressor component, the header may be reordered such that the static fields are grouped together and placed at the beginning of the packet and dynamic fields are placed afterwards. As a result, the reordering helps pattern encoding to match longer string bytes and replace them with a single address location, hence improving the compression gain.

The de-compressor component may restore the header back to its original form by reversing the process. During operation, the memory components at both compressor and de-compressor may be updated with the reordered header fields.

In an additional or alternative aspect, the present apparatus and methods may perform a header-only compression with respect to a first number of bytes of the transmission data packet. For example, the header-only compression may be configured by a radio network controller (RNC) or by way of dynamic fallback by a user equipment (UE). In an aspect, the first N bytes of data, where N is a positive integer, may be determined based on a rule to be (e.g., treated as) the header. For example, a minimum TCP/IP header is 40 bytes for IP v4 and 60 bytes for IPv6. As such, and in a non-limiting example, the first 80 bytes of data may be treated as header. By determining based on a rule that the first N (e.g., 80) bytes of data are the header, parsing of data packets (e.g., header fields) to determine where headers end within the packet becomes unnecessary. Further, such a determination is easy to implement at both the compressor and de-compressor and there is no loss in compression efficiency since a significant amount of compression memory will be filled with header information (and not incompressible data).

Referring to FIG. 1, in one aspect, a wireless communication system 100 is configured to facilitate transmitting vast amount of data from a mobile device to a network at a fast data transfer rate. Wireless communication system 100 includes at least one UE 114 that may communicate wirelessly with one or more network 112 via serving nodes, including, but not limited to, wireless serving node 116 over one or more wireless link 125. The one or more wireless link 125, may include, but are not limited to, signaling radio bearers and/or data radio bearers. Wireless serving node 116 may be configured to transmit one or more signals 123 to UE 114 over the one or more wireless link 125, and/or UE 114 may transmit one or more signals 124 to wireless serving node 116. In an aspect, signal 123 and signal 124 may include, but are not limited to, one or more messages, such as transmitting a data from the UE 114 to network 112 via wireless serving node 116.

In an aspect, UE 114 may include a call processing component 140, which may be configured to transmit a data to the wireless serving node 116 over wireless link 125. Specifically, in an aspect, call processing component 140 of UE 114 may be configured for receiving a transmission data packet, detecting a string of bytes in the transmission data packet, replacing the string of bytes of the transmission data packet, and assigning entropy coding bit strings to a set of literal-bytes remaining in the transmission data packet. In other words, call processing component 140 operates to compress the transmission data packet. Further, in an aspect of performing the compression, call processing component 140 of UE 114 may be configured to identify static and dynamic fields within a header of a transmission data packet and reorder the fields to group together the static fields followed by the dynamic fields. Accordingly, upon applying compression to at least the reordered header, the transmission data packet with the reordered header may experience increased compression gains, as compared to the transmission data packet without the reordered header, due to the grouping of the static fields. In an alternative or additional aspect of performing the compression, call processing component 140 of UE 114 may be configured to define a first number of bytes of the transmission data packet as the header, to optionally perform the reordering of the static and dynamic fields within the first number of bytes of the transmission data packet, and to compress at least the first number of bytes of the transmission data packet. Similarly, in an alternative or additional aspect, the above noted functionally of call processing component 140 may be included in network 112, as represented by call processing component 150.

UE 114 may comprise a mobile apparatus and may be referred to as such throughout the present disclosure. Such a mobile apparatus or UE 114 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 116 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other base station, access point or cell having a substantially smaller transmit power or coverage area than a macro base station or cell.

Figure 2:
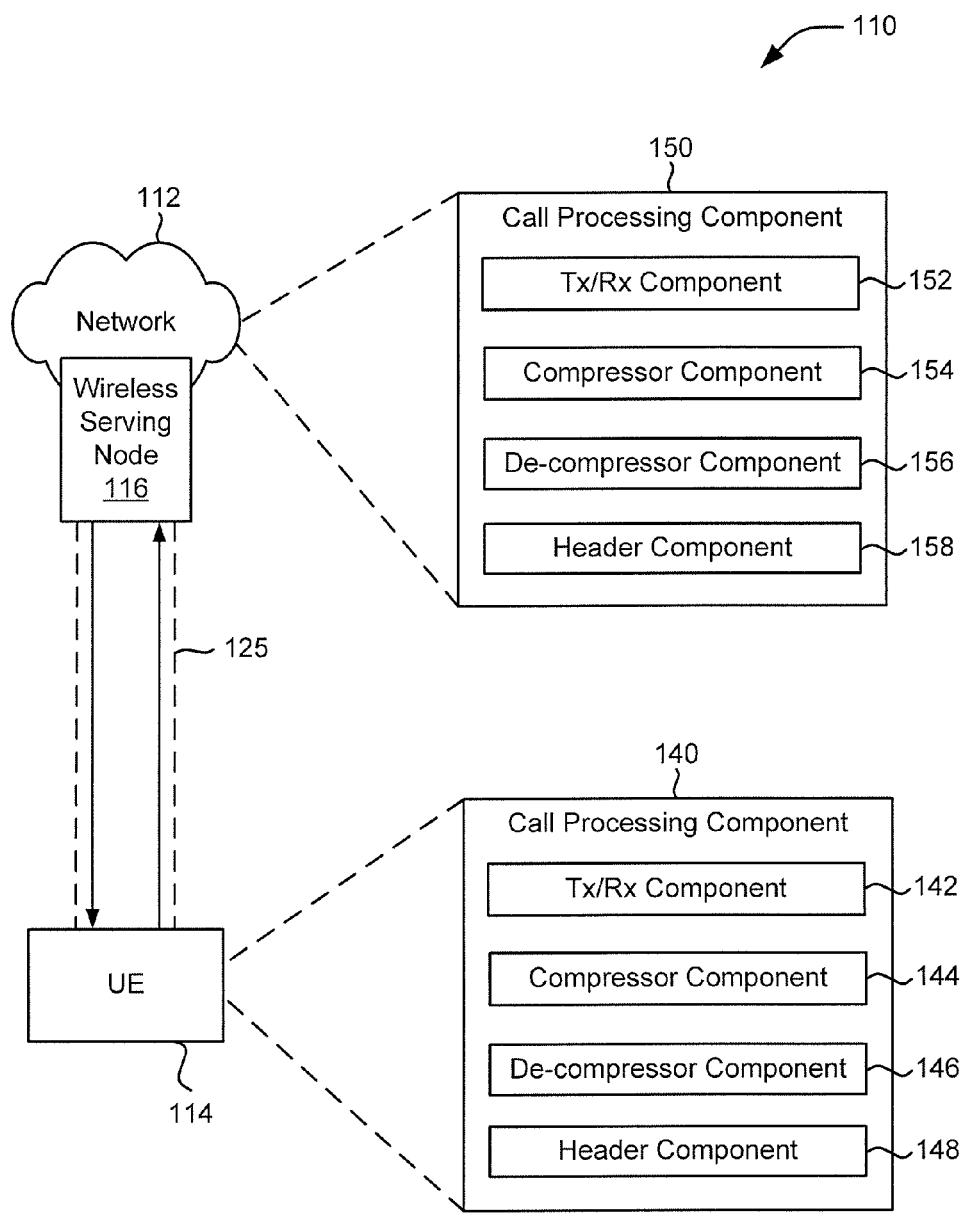
FIG. 2 is a schematic diagram illustrating exemplary aspect of call processing in a wireless communication system.

Referring to FIG. 2, in another aspect of the present apparatus and method, a wireless communication system 110 is configured to include wireless communications between network 112 and user equipment (UE) 114. The wireless communications system may be configured to support communications between a number of users. FIG. 2 illustrates a manner in which network 112 communicates with UE 114. The wireless communication system 110 can be configured for downlink message transmission or uplink message transmission, as represented by the up/down arrows between network 112 and UE 114.

In an aspect, UE 114 may be configured to include the call processing component 140. The call processing component 140 may be configured, among other things, to include a TX/RX component 142 configured to transmit and receive transmission data packets. For example, call processing component 140 may be configured to include TX/RX component 142, which may be capable of transmitting and/or receiving data to/from network 112 via wireless serving node 116 over link 125.

The call processing component 140 may also be configured to include a compressor component 144 capable of pattern encoding and entropy encoding. For example, compressor component 144 may be configured for compressing the data transmitted to network 112 via wireless serving node 116 over link 125.

The call processing component 140 may also be configured to include a de-compressor component 146 capable of pattern decoding and entropy decoding. For example, de-compressor component 146 may be configured for de-compressing the data received from network 112 via wireless serving node 116 over link 125.

Additionally, the call processing component 140 may also be configured to include a header component 148 capable of reordering the header of a transmission data packet. For example, header component 148 may be configured for determining a transmission protocol of a transmission data packet, identifying one or more static fields and one or more dynamic fields within a header of the transmission data packet, and reordering the one or more static fields and the one or more dynamic fields within the header of the transmission data packet. Moreover, in an additional or alternative aspect, header component 148 may be configured for identifying a header of a transmission data packet based on a rule that the header of the transmission data packet occupies a first number of bytes of the transmission data packet.

Similarly, in an alternative or additional aspect, the above noted functionally of call processing component 140 may be included in network 112, as represented by call processing component 150. For example, but not limited hereto, call processing component 150 may be hardware mounted within network 112, software or computer readable media and/or firmware stored within a memory or processor of network 112, or any combination thereof.

Furthermore, in an aspect, call processing component 150 of network 112 may be configured to include TX/RX component 152 capable of transmitting and receiving transmission data packets. Still further, call processing component 150 of network 112 may be configured to include compressor component 154 capable of pattern encoding and entropy encoding. In addition, call processing component 150 of network 112 may be configured to include a de-compressor component 156 capable of pattern decoding and entropy decoding. Moreover, call processing component 150 of network 112 may be configured to include header component 158 capable of reordering the header of a transmission data packet. Additionally or in the alternative, header component 158 may be configured for identifying a header of a transmission data packet based on a rule that the header of the transmission data packet occupies a first number of bytes of the transmission data packet.

Thus, the present apparatus and methods include a UE-based, and/or network based, call processing component capable of compressing and decompressing received transmission data packets in order to minimize transmission data packet size.

Figure 3:
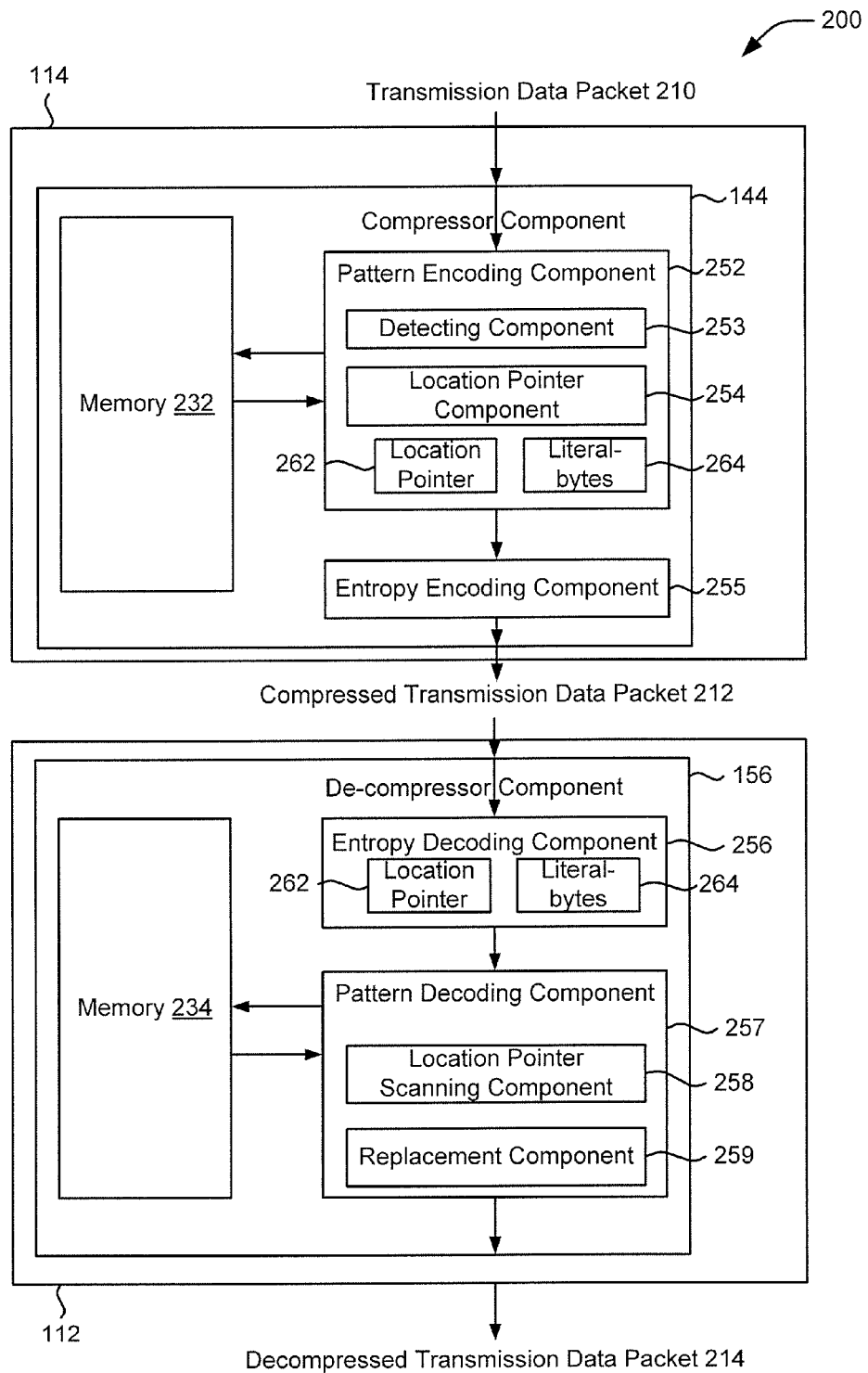
FIG. 3 is a schematic diagram illustrating the functionally and operation of compression and decompression components in a wireless communication system.

FIG. 3 is a schematic diagram 200 further illustrating the functionality and operation of the compressor component 144 and the de-compressor component 156, respectively represented by and equivalent to compressor component 144/154 and de-compressor component 146/156 that reside in call processing component 140/150 of FIG. 2. Generally, call processing component 140 may be configured to transmit a transmission data packet 210 as a compressed transmission data packet 212 from UE 114 to network 112 after being routed through a UE-based compressor component 144. Transmission data packet 210 refers to signals 123 transmitted from UE 114 to network 112 over wireless link 125, which may include bits, bytes, etc., utilized for transmission.

Once network 112 receives the compressed transmission data packet 212 from UE 114, call processing component 150, is configured to route the compressed transmission data packet 212 through a network-based de-compressor component 156, resulting in decompressed transmission data packet 214. The decompressed transmission data packet 214 may then be utilized by network 112 according to the information located within in the decompressed transmission data packet 214.

It should be noted that the process of compressing and decompressing is represented by the down arrows between UE 114 and network 112 of FIGS. 2 and 3. Note, the direction of transmitting the compressed transmission data packet 212 may be configured to occur from UE 114 to the network 112, as discussed above, and/or from network 112 to UE 114. If the direction of transmitting the compressed transmission data packet 212 occurs from network 112 to UE 114, the components described in FIG. 3 will have corresponding components for compression at network 112, as represented by compressor component 154 (FIG. 2), and decompression at UE 114, as represented by de-compressor 146 (FIG. 2).

Compressor component 144 of UE 114 may include a pattern encoding component 252 and an entropy encoding component 255 and a UE-based memory 232. Both the pattern encoding component 252 and the entropy encoding component 255 are capable of encoding transmission data packets sent to the compressor component 144.

The pattern encoding component 252 may also be configured to include a detecting component 253 and a location pointer component 254. The detecting component 253 is capable of detecting a string of bytes in the transmission data packet that matches a preset string of bytes saved in a UE-based memory 232. In addition, the location pointer component 254 is capable of replacing the string of bytes of the transmission data packet that has been determined to match the preset string of bytes saved in the UE-based memory 232 with location pointer 262. The location pointer component 254 may also be configured to replace selected string of bytes of the transmission data packet, as determined by UE 114 or network 112.

The location pointer 262 specifies the location in the UE-based memory 232 where the preset string of bytes is saved and is referenced for later decompression. Moreover, there may be a plurality of location pointer(s) 262 that match a plurality of preset string of bytes saved in a UE-based memory 232. Further, location pointer 262 may also be configured to include a length indication indicating the number of bytes of the saved preset string of bytes saved in the UE-based memory 232.

In other words, the goal of pattern encoding component 252 is to detect strings of bytes in the current packet being compressed that match bytes preset in the UE-based memory 232. Upon detecting such a match, this particular byte pattern may be replaced by a pointer to the location (location pointer 262) in the UE-based memory 232 that was determined as a match. As such, this operation replaces large strings of bytes with fewer ones, so the output from pattern encoding then only includes either a set of literal-bytes 264 (bytes of the transmission packet not replaced by the location pointer) or pointers to locations (location pointer 262) in the UE-based memory 232.

In an aspect, after the transmission data packet is encoded by the pattern encoding component 252, the output from pattern encoding may be routed to the entropy encoding component 255. The entropy encoding component 255 may be configured to assign entropy coding bit strings to both the set of literal-bytes 264 remaining in the transmission data packet 210 and to the location pointer 262 in order to generate a compressed transmission data packet 212. It should be noted that literal-bytes 264 may be defined as the bytes remaining in the transmission data packet 210 after the location pointer component 254 has replaced some of the bytes in the transmission data packet 210 with location pointer 262.

In an aspect, entropy encoding component 255 is configured to assign bit strings to both the set of literal-bytes 264 remaining in the transmission data packet 210 after pattern encoding and to location pointer 262 in order to generate a packet with small overall bit length (i.e., a small number of bits). This allows for the literal-bytes 264 and location pointer 262 to be uniquely recovered from the output bit string. Assigning bit strings to the set of literal-bytes 264 and location pointer 264 may be performed by well known algorithms, such as Huffman coding and Adaptive Arithmetic Coding. Furthermore, the assignment may be based on pre-configured static mapping between the literal-bytes/location pointers and bit strings.

In an aspect, entropy coding may create and assign a unique prefix-code to each unique symbol that occurs in the input. These entropy encoders then compress data by replacing each fixed-length input symbol with a corresponding variable-length prefix-free output codeword. For example, entropy encoding component 255 assigns a unique prefix-code to both literal-bytes 264 and location pointer 262 and replaces each fixed code corresponding variable-length prefix-free output codeword to generate a compressed data packet with small overall bit length.

Once the transmission data packet 210 is compressed by the compressor component 144, the resulting compressed transmission data packet 212 may be sent to the de-compressor component 156 of network 112. In correspondence with compressor component 144, the de-compressor component 156 may be configured to include an entropy decoding component 256 and a pattern decoding component 257. Pattern decoding component 257 may include a location pointer scanning component 258 and a replacement component 259.

In an aspect, for example, when the de-compressor component 156 receives the compressed data packet 212, the entropy decoding component 256 may be configured to decode the entropy coding bit strings in the compressed transmission packet 212 to generate the set of literal-bytes 264 and location pointer 262. As such, the entropy decoding component 256 performs the inverse function of the entropy encoding function.

Further, the set of literal-bytes 264 and the location pointer 262 may be then routed to the pattern decoding component 257, where location pointer scanning component 258 scans the location pointer 262 to determine which preset string of bytes saved in the network-based memory 234 are to be used. As a result, the replacement component 259 then replaces the location pointer 262 with the preset string of bytes saved in the network-based memory 234 to generate decompressed transmission data packet 214, which may be identical to transmission data packet 210 before compression. In other words, the pattern decoding component 257 scans the locations pointers 262 from the output of the entropy decoding component 256 and replaces the location pointer 262 with the preset string of bytes saved in the network-based memory 234 referred to by the location pointer 262.

Both the UE-based memory 232 and the network-based memory 234 include an amount of memory in which the payloads of the most recent packets in the data flow are stored. After a transmission data packet 210 is compressed at the compressor component 144, the uncompressed bits of the transmission data packet are inserted in memory (UE-based memory 232). If there is insufficient space in memory for this operation, then the oldest bits are removed to create space.

After a transmission data packet 212 is decompressed at the de-compressor component 156, the bits of the compressed transmission data packet 212 are inserted in memory (network-based memory 234). If there is insufficient space in memory for this operation, the oldest bits are removed to create space. In some aspects, both the UE-based memory 232 and the network-based memory 234 may be emptied for synchronization purposes.

Other aspects of this apparatus and methods include performing compression operation only on a certain part of the transmission data packet. For example, in some aspects, when operating on Transmission Control Protocol/Internet Protocol (TCP/IP) packets, the TCP payload may be compressed using the above method, while the header could be compressed using other techniques such as Robust Header Compression (ROHC).

Still other aspects may be configured to allow both the pattern-coding and entropy coding functions at the compressor component 144/154 and the de-compressor component 156/146 to be transparent, in that the compressor component 144/154 and the de-compressor component 156/146 do not perform any functional operation on the input data. This allows for sending the original packet uncompressed, if the overhead associated with compression is not acceptable. In other words, the functions of the compressor component 144/154 and the de-compressor component 156/146 may be rendered inactive when overhead associated with coding compression/decompression becomes unreadable or unacceptable by UE-based memory 232 or network based memory 234.

Figure 4:
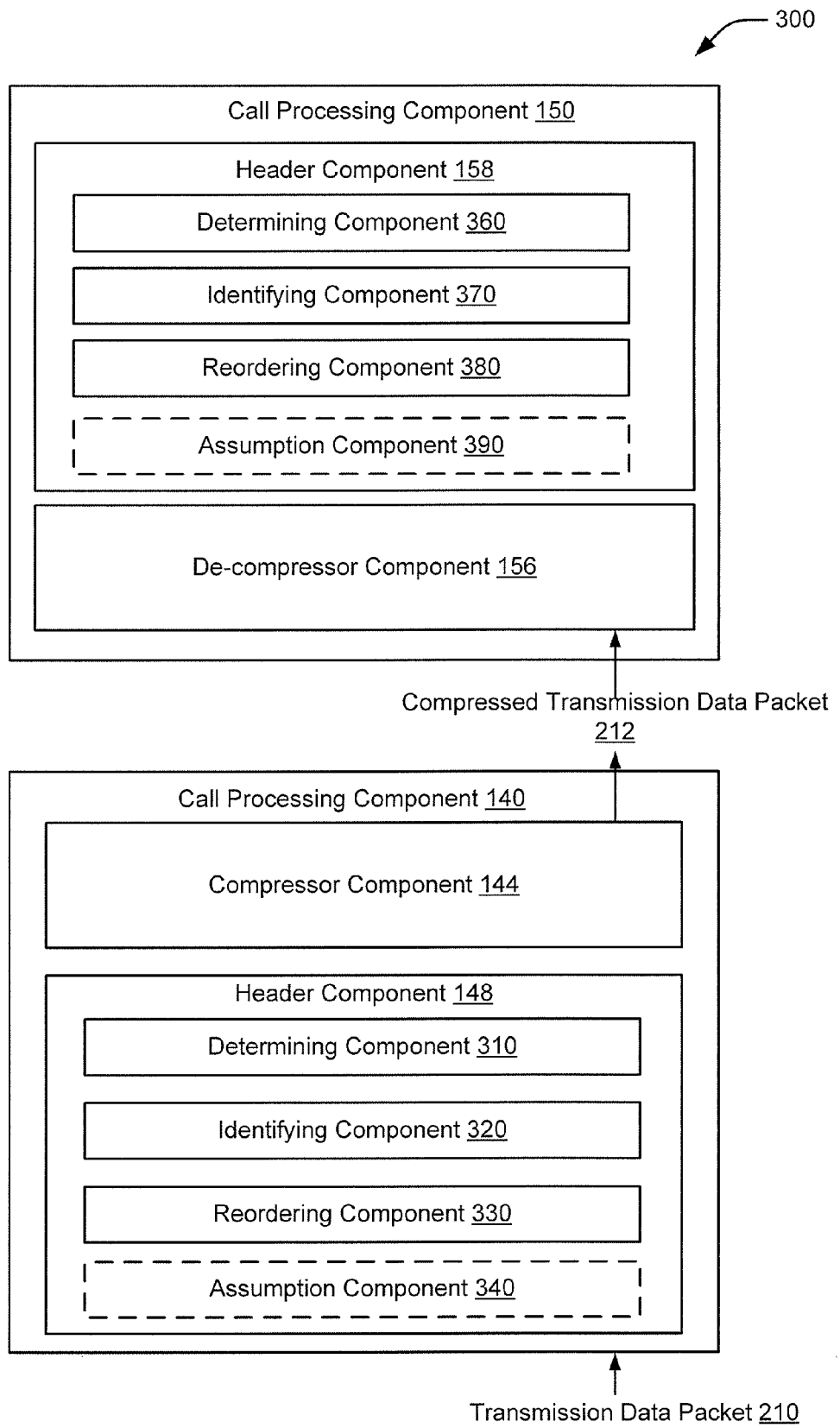
FIG. 4 is a schematic diagram illustrating the functionally and operation of alternative compression and decompression components in a wireless communication system

FIG. 4 is a schematic diagram illustrating the functionality and operation of additional or alternative compression and decompression components for wireless communication system 100. In this example, call processing component 140 of UE 114 (FIG. 1) may operate to compress a transmission data packet 210 to form compressed transmission data packet 212, which is sent to call processing component 150 of wireless serving node 116 or network 112 (FIG. 1). Specifically, in an aspect, header component 148 of FIG. 4, located within call processing component 140 of UE 114 (FIG. 1), may include a determining component 310 for determining a transmission protocol of a transmission data packet 210. For example, the transmission protocol may include at least one or more of an Internet Protocol (IP), Transmission Control Protocol (TCP) over IP, and User Datagram Protocol (UDP) over IP.

The header component 148 may also be configured to include an identifying component 320 capable of identifying one or more static fields and one or more dynamic fields within a header of the transmission data packet 210. For example, header component 148 may be configured to identify the one or more static fields as one or more fields with a high probability of not changing across a plurality of transmission data packets and to identify the one or more dynamic fields a one or more fields with a high probability of changing across the plurality of transmission data packets. In some instances, static fields with a high probability of not changing across a plurality of transmission data packets (e.g., IPV4) may include fields Version, IHL, DSCP, ECN, Flags, Fragment Offset, Source IP address, Destination IP Address, TTL, and Protocol. On the contrary, dynamic fields with a high probability of changing across the plurality of transmission data packets (e.g., IPV4) may include fields Header Checksum, Identification, Total Length, and <IP-Options>.

The header component 148 may also be configured to include a reordering component 330 capable of reordering the one or more static fields and the one or more dynamic fields within the header of the transmission data packet 210. For example, reordering component 330 may be configured to group together the one or more static fields within the header of the transmission data packet 210, and place the one or more static fields at a beginning of the header in response to grouping together the one or more static fields.

Further, reordering component 330 may be configured to group together the one or more dynamic fields within the header of the transmission data packet 210, and place the one or more dynamic fields at an end of the header in response to grouping together the one or more dynamic fields.

Moreover, in an additional aspect, header component 148 may be configured to include an assumption component 340 capable of identifying a header of a transmission data packet based on a rule that the header of the transmission data packet occupies a first number of bytes of the transmission data packet. In an aspect, the first N bytes of the transmission data packet 210 may be determined based on a rule to be (e.g., treated as) header. The rule may be established based on preconfigured settings and/or it may be adapted during UE/network configurations, which may include input from at least one of a user, network, and application. For example, a minimum TCP/IP header is 40 bytes for IPV4 and 60 bytes for IPV6. As such, and in a non-limiting example, assumption component 340 may be configured to treat the first 80 bytes of transmission data packet 210 as header. In other words, in this additional aspect, assumption component 340 may assist identifying component 320 and reordering component 330 in performing the identifying and the reordering by performing the identifying within the first number of bytes of the transmission data packet 210 and by performing the reordering of the first number of bytes of the transmission data packet 210.

By determining based on a rule that the first N (e.g., 80) bytes of data of transmission data packet 210 are header, parsing of transmission data packet 210 (e.g., header fields) to determine where headers end within the transmission data packet 210 becomes unnecessary. Further, such an assumption is easy to implement at both the compressor and de-compressor and there is no loss in compression efficiency since a significant amount of compression memory (e.g., memory 232 and/or 234 of FIG. 3) will still be filled with IP headers (and not incompressible data).

In an alternative aspect, header component 148 may be configured to include only assumption component 340 such that header component 148 operates to identify or otherwise define the header of transmission data packet 210 as being a first number of bytes of transmission data packet 210.

Additionally, in an aspect, call processing component 140 may be configured to include compressor component 144 configured to compress the transmission data packet to form a compressed transmission data packet 212 after the reordering of the one or more static fields and the one or more dynamic fields. In an alternative aspect, compressor component 144 may be configured to perform a header-only compression by compressing the header of the transmission data packet 210 based on assumption component 340 identifying the header of transmission data packet 210. Further, in some aspects, call processing component 140 may execute TX/RX component 142 (FIG. 2) to transmit the compressed transmission data packet 212.

In another aspect, de-compressor component 156 of FIG. 4, located within call processing component 150, may be configured to receive a compressed transmission data packet (via TX/RX component 152 in FIG. 2), such as compressed data packet 212 formed by one of the operations described above, and decompress the compressed transmission data packet to form a decompressed transmission data packet.

In an aspect, call processing component 150 may also be configured to include header component 158. The header component 158 may be configured to correspond to and operate with header component 148, e.g., to include determining component 360, identifying component 370, reordering component 380, and, in an optional additional or alternative aspect, assumption component 390. As such, de-compressor component 156 and header component 158 and its subcomponents may be configured to operate in an inverse manner, and in an inverse order as compared to the operation of compressor component 146 and header component 148.

In some aspects, call processing components 140 and 150 may be configured to update a memory (such as memory 232 in FIG. 3) with the compressed transmission data packet, and update the memory (such as memory 234 in FIG. 3) with the decompressed transmission data packet.

Figure 5:
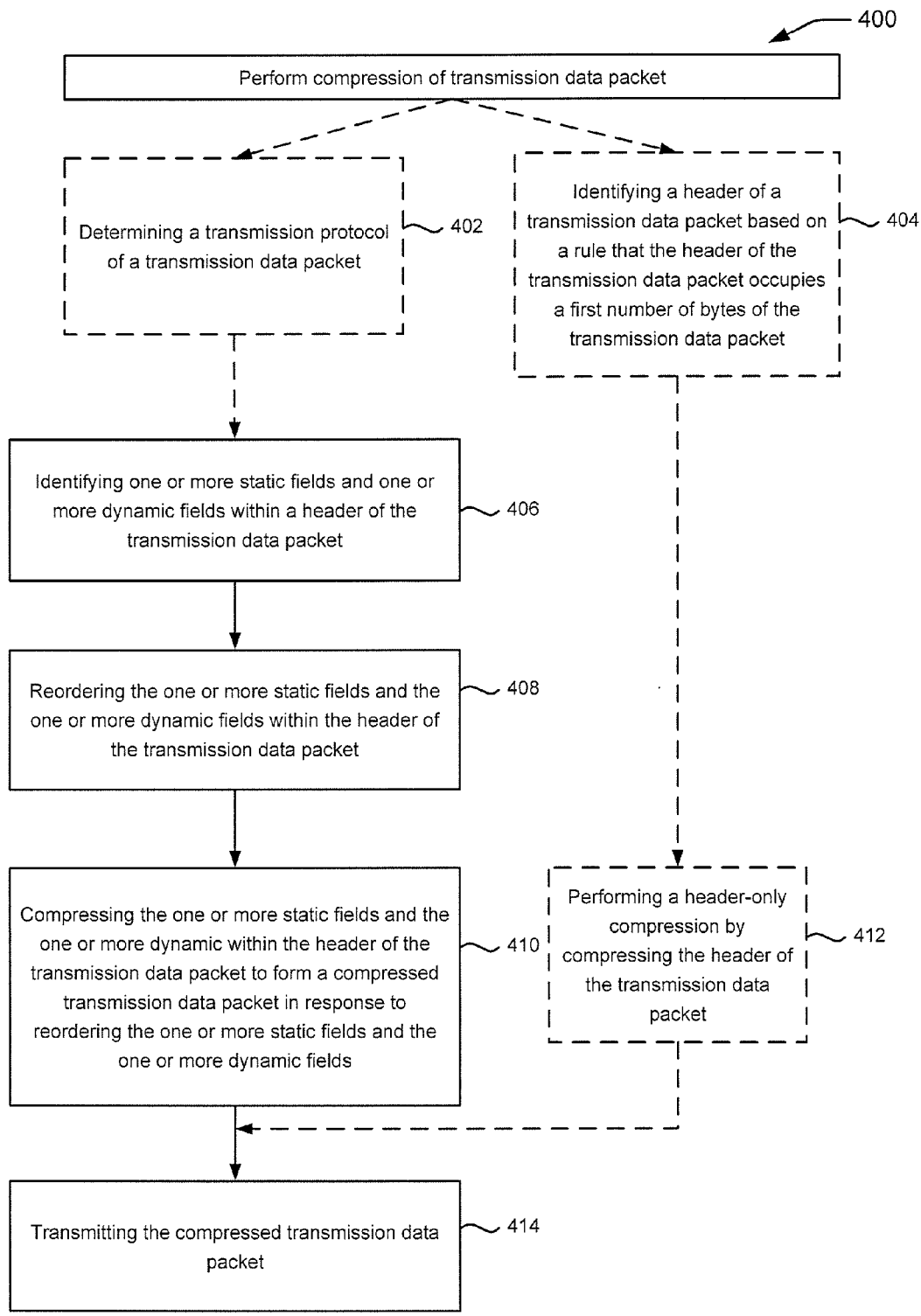
FIG. 5 is a flow diagram illustrating an exemplary method for call processing in a wireless communication system.

Referring to FIG. 5, in operation, a UE such as UE 114 (FIG. 2), or a network such as network 112 (FIG. 2) may perform one aspect of a method 400 for reordering a header and/or determining a first number of bytes of a packet are the header based on a rule, for efficient packet compression and/or performing header-only compression. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, method 400 includes performing compression on a transmission data packet, including reordering of a header for efficient packet compression and/or performing header-only compression. For example, as described herein, call processing component 140 may execute header component 148 (FIG. 4) to determine whether to perform reordering of a header for efficient packet compression or performing header-only compression. When performing reordering of a header for efficient packet compression, the method 400 may proceed to block 402.

At block 402, method 400 optionally includes determining a transmission protocol of a transmission data packet. For example, as described herein, header component 148 may execute determining component 310 (FIG. 4) to determine a transmission protocol of a transmission data packet 210. For example, the transmission protocol may include at least one or more of an Internet Protocol (IP), Transmission Control Protocol (TCP) over IP, and User Datagram Protocol (UDP) over IP.

At block 406, method 400 includes identifying one or more static fields and one or more dynamic fields within a header of the transmission data packet. For example, as described herein, header component 148 may execute identifying component 320 (FIG. 4) to identify one or more static fields and one or more dynamic fields within a header of the transmission data packet 210. Static fields comprise one or more fields with a high probability of not changing across a plurality of transmission data packets while dynamic fields comprise one or more fields with a high probability of changing across the plurality of transmission data packets.

In some instances, identification of the one or more static fields and the one or more dynamic fields within the header of the transmission data packet 210 may be based at least in part on determining the transmission protocol of transmission data packet 210. For instance, if determining component 310 (FIG. 4) determines that the transmission protocol of transmission data packet 210 is Internet Protocol version 4 (IPV4) then identifying component 158 may know that the header comprises fields Version, IHL, DSCP, ECN, Flags, Fragment Offset, Source IP address, Destination IP Address, TTL, Protocol, Header Checksum, Identification, Total Length, and <IP-Options>. As such, identifying component 158 may identify that fields Version, IHL, DSCP, ECN, Flags, Fragment Offset, Source IP address, Destination IP Address, TTL, and Protocol are static fields, and fields Header Checksum, Identification, Total Length, and <IP-Options> are dynamic fields.

Further at block 408, method 400 includes reordering the one or more static fields and the one or more dynamic fields within the header of the transmission data packet. For example, as described herein, header component 148 may execute reordering component 330 (FIG. 4) to reorder the one or more static fields and the one or more dynamic fields within the header of the transmission data packet 210. In the instance where determining component 310 (FIG. 4) determines that the transmission protocol of transmission data packet 210 is IPV4, reordering component 330 may perform the reordering procedure for the IPV4 header, causing fields Version, IHL, DSCP, ECN, Flags, Fragment Offset, Source IP address, Destination IP Address, TTL, and Protocol to be reordered to the beginning of IPV4 header. Dynamic fields Header Checksum, Identification, Total Length, and <IP-Options> would be reordered to the back of IPV4 header.

Additionally, at block 410, method 400 includes compressing the one or more static fields and the one or more dynamic within the header of the transmission data packet to form a compressed transmission data packet in response to reordering the one or more static fields and the one or more dynamic fields. For example, as described herein, call processing component 140 may execute compressor component 144 (FIG. 4) to compress the one or more static fields and the one or more dynamic within the header of the transmission data packet 210 to form a compressed transmission data packet 212 in response to reordering the one or more static fields and the one or more dynamic fields. In some aspects, compression component 144 (FIG. 4) may perform compression procedures as described with respect to FIG. 3 above.

Alternatively, or in addition to the above-described actions, when performing header-only compression, the method 400 may proceed to block 404. In an aspect, at block 404, method 400 optionally includes identifying a header of a transmission data packet based on a rule that the header of the transmission data packet occupies a first number of bytes of the transmission data packet. For example, as described herein, call processing component 140 may execute assumption component 340 (FIG. 4) to identify a header of a transmission data packet 210 based on assuming that the header of the transmission data packet 210 occupies a first number of bytes of the transmission data packet 210. In certain instances, a minimum TCP/IP header is 40 bytes for IPV4 and 60 bytes for IPV6. As such, and in a non-limiting example, assumption component 340 (FIG. 4) may be configured to determine based on a rule that the first 80 bytes of data may be treated as a header. The rule may be established based on preconfigured settings and/or it may be adapted during UE/network configurations. Assumption component 340 (FIG. 4) may be configured to identify the header without parsing the transmission data packet 210 to determine a location at which the header ends. As such, in an aspect where block 404 is used in addition to the actions of blocks 402, 406, and 408, the identifying of the header as a first number of bytes of the packet may be performed to assist in the actions of identifying the static and dynamic fields, and in reorder the static and dynamic fields, which may both be performed on the first number of bytes of the packet, as defined by the operations of block 404.

Further, at block 412, in an aspect, the method optionally includes performing a header-only compression by compressing the header of the transmission data packet. For example, as described herein, call processing component 140 may execute compression component 144 (FIG. 4) to perform a header-only compression by compressing the header of the transmission data packet 210. Compression component 144 (FIG. 4) may be configured to compress the header of the transmission data packet 210 that was identified by assumption component 340, and form a compressed transmission data packet 212. In some aspects, compression component 144 (FIG. 4) may perform compression procedures as described with respect to FIG. 3 above.

At block 414, each aspect of method 400 may include transmitting the compressed transmission data packet. For example, as described herein, call processing component 140 may execute TX/RX component 144 (FIG. 4) to transmit the compressed transmission data packet 212. In some instances, the compressed transmission data packet 212 may be transmitted to call processing component 150 of wireless serving node 116 or network 112 (FIG. 1). As such, call processing component 150 may execute de-compressor component 156 to de-compress the compressed transmission data packet 212, and execute header component 158 to reorder the fields within the header of the de-compressed transmission data packet back to their original state.

FIGS. 6A-C and 7-10 are conceptual diagrams illustrating various aspects of transmission protocols for a header within a transmission data packet, such as transmission data packet 210 (FIG. 4), and a reordered header within a compressed transmission data packet 212 (FIG. 4).

Figure 6A:
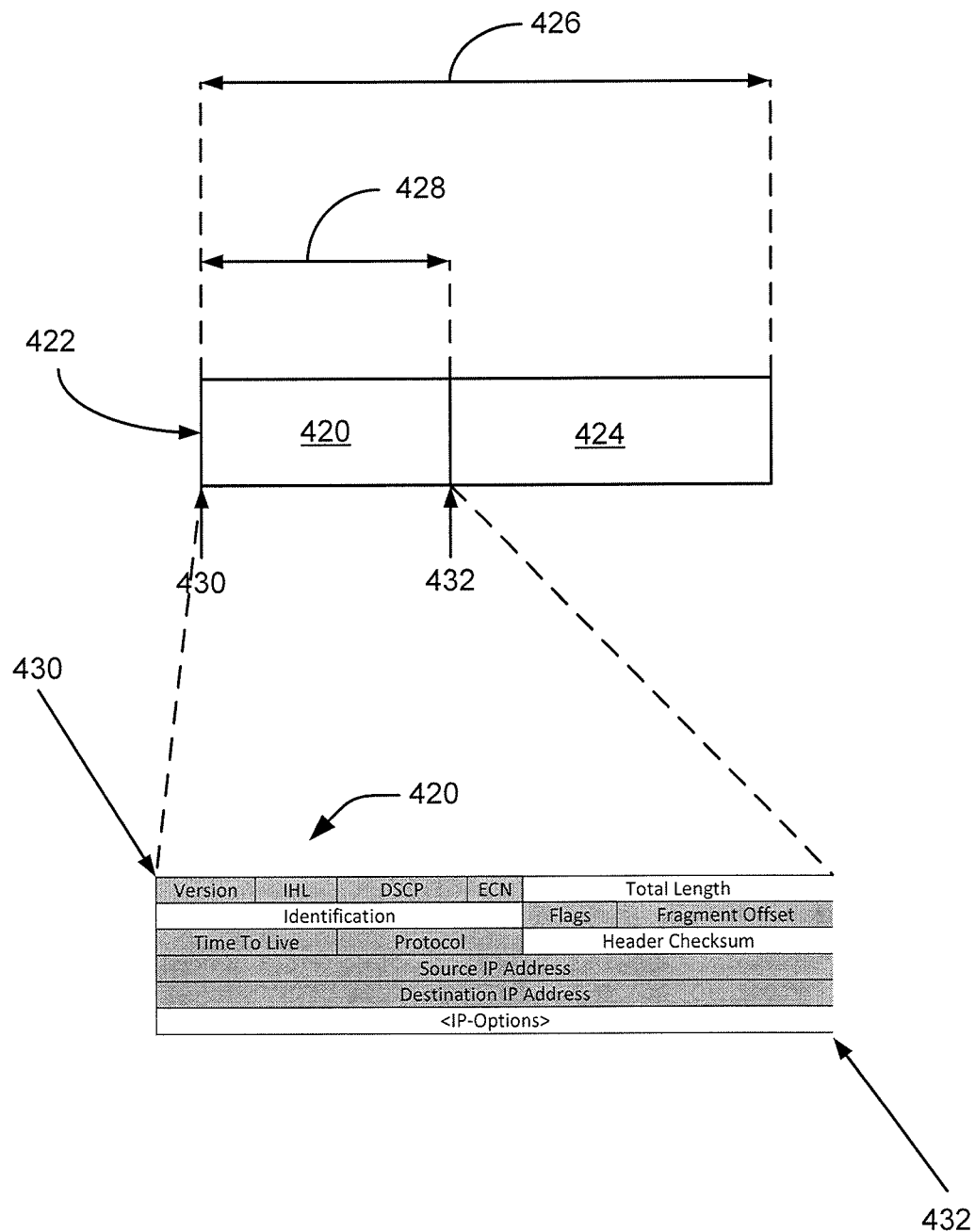
FIGS. 6A-6C and 7A-10B are conceptual diagrams illustrating aspects of the present disclosure.

For example, in FIG. 6A, header 420 corresponds to an Internet Protocol version 4 (IPV4) header 420 within a transmission data packet 422 similar to transmission data packet 210 (FIG. 4). The static fields within header 420 are shaded while the dynamic fields are not. The static fields have a high probability of being present in the memory component (such as memory 232 and/or 234 in FIG. 3). In other words, according to an aspect, reordering of the static fields to group them together and place them at the beginning of the packet may allow for increased compressions gains.

In some aspects, transmission data packet 422 comprises IPV4 header 420 and body 424. Further, transmission data packet 422 may have a packet byte length 428 corresponding to the number of bytes within transmission data packet 422. Additionally, IPV4 header 420 may have a header byte length 428 corresponding to the number of bytes within IPV4 header 420. The beginning and end for IPV4 header 420 may be shown by start point 430 and end point 432, respectively. As an example, start point 430 may point to the beginning of IPV4 header 420 (and transmission data packet 422), at the beginning of the Version field. Moreover, end point 432 may point to the end of IPV4 header 432, after the <IP-Options> field. The header byte length 428 may be determined based at least in part on header component 148/158 and/or determining component 360/310 determining the transmission protocol of the transmission data packet 422 (e.g., IPV4), and the Total Length field within IPV4 header 420.

As such, header component 148/158 (FIG. 4) may perform the reordering procedure for IPV4 header 420, causing fields Version, IHL, DSCP, ECN, Flags, Fragment Offset, Source IP address, Destination IP Address, TTL, and Protocol to be reordered to the beginning of IPV4 header 420. Dynamic fields Header Checksum, Identification, Total Length, and <IP-Options> would be reordered to the back of IPV4 header 420.

Figure 6B:
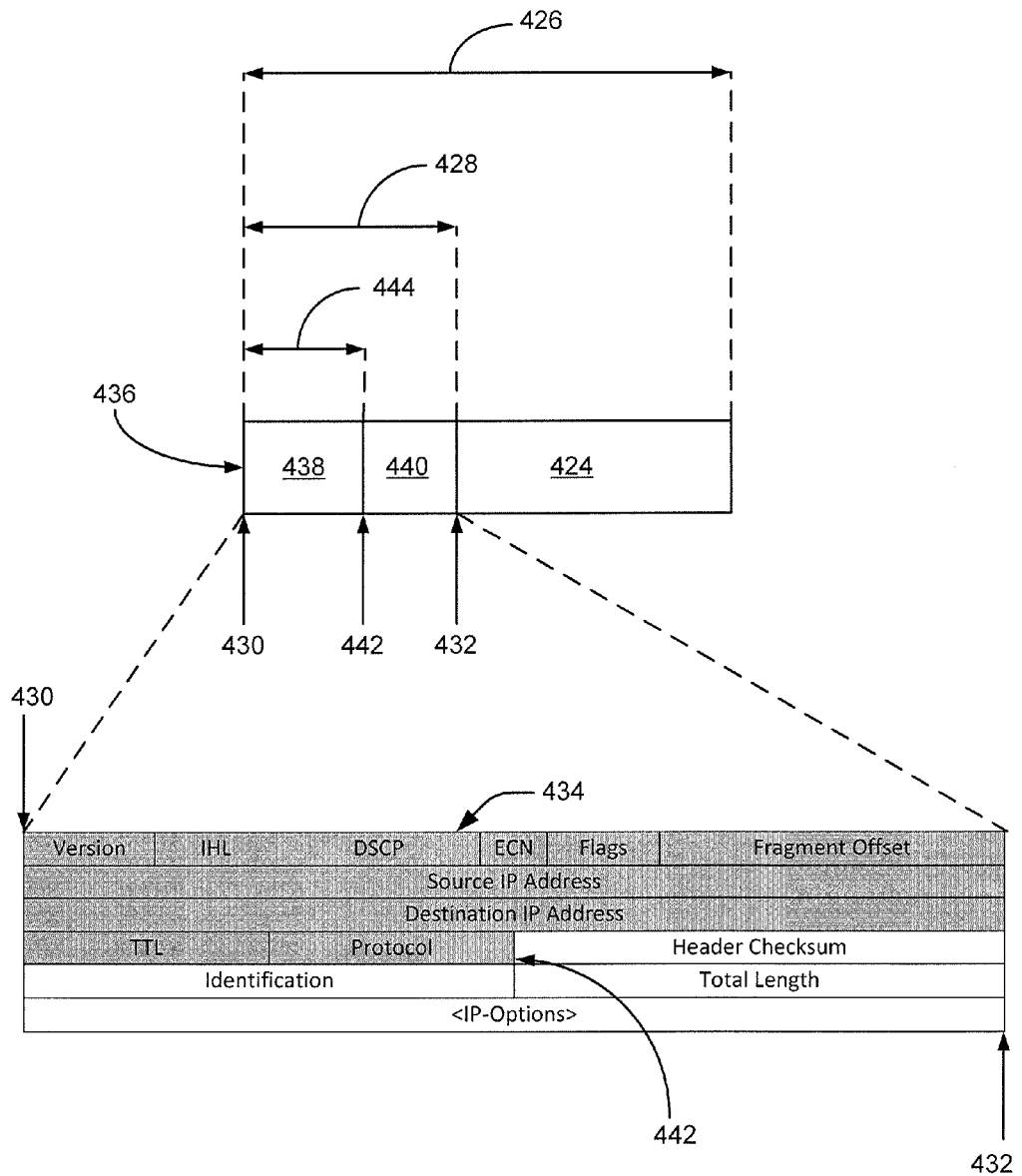

FIG. 6B illustrates the reordered IPV4 header 434 (formerly IPV4 header 420) with the static fields 438 moved to the beginning of the reordered IPV4 header 434, and the dynamic fields 440 moved to the back of the reordered IPV4 header 434. Thus, static fields 438 may comprise Version, IHL, DSCP, ECN, Flags, Fragment Offset, Source IP address, Destination IP Address, TTL, and Protocol fields, while dynamic fields 440 may comprise Header Checksum, Identification, Total Length, and <IP-Options> fields.

In certain aspects, reordered transmission data packet 436 comprises IPV4 header 434 and body 424. Similar to transmission data packet 422 (FIG. 6A), reordered transmission data packet 436 may comprise a packet byte length 428 corresponding to the number of bytes within reordered transmission data packet 436, which is the same as the number of bytes within transmission data packet 436. Additionally, reordered IPV4 header 434 may comprise header byte length 428, start point 430, end point 432, which are the same as IPV4 header 420's (FIG. 6A). However, reordered IPV4 header 434 may comprise reordered static field byte length 444, which corresponds to the byte length from the beginning of the Version field (e.g., at start point 430) to the end of the Protocol field (e.g., at static field end point 442).

Figure 6C:
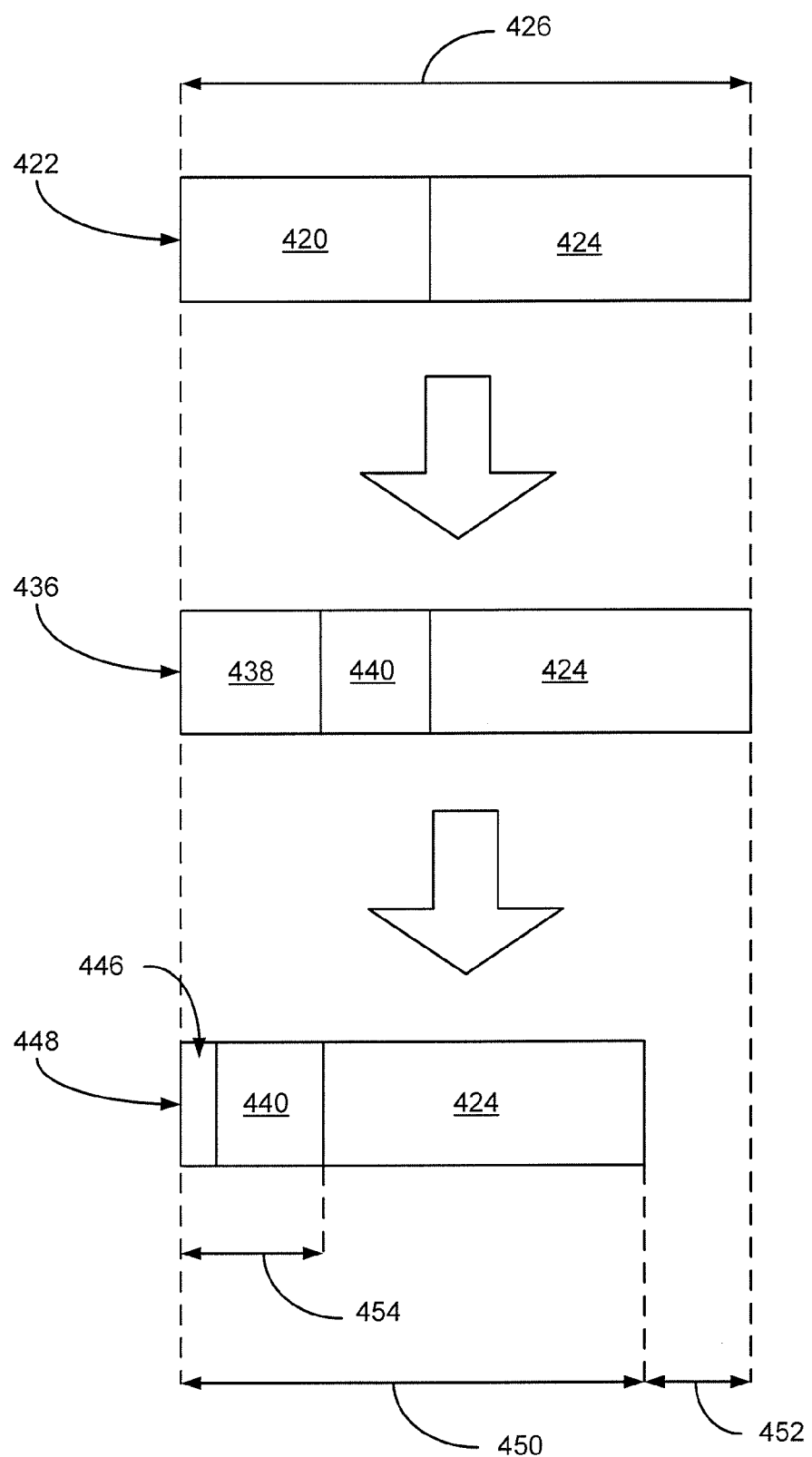
Figure 7A:
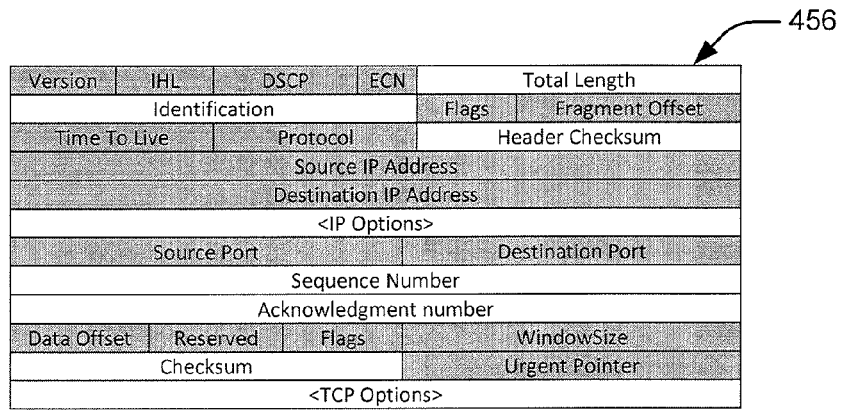
Figure 7B:
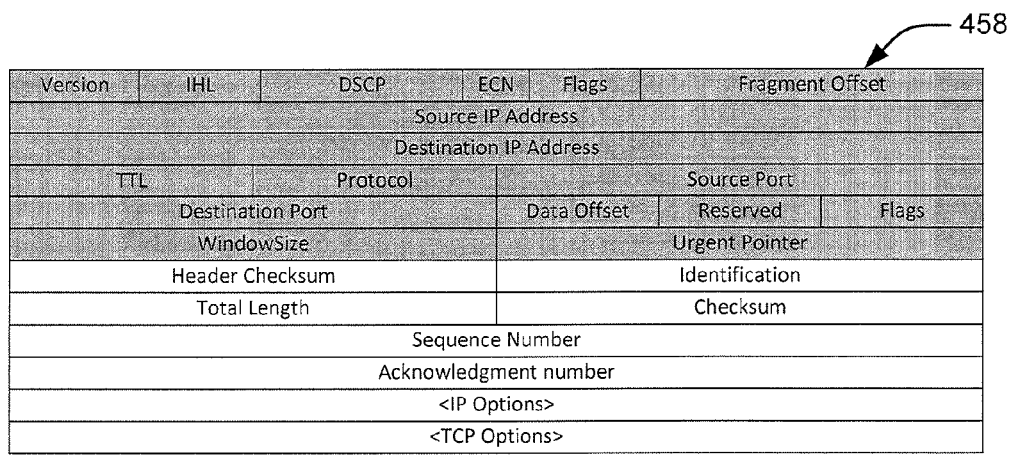
Figure 8A:
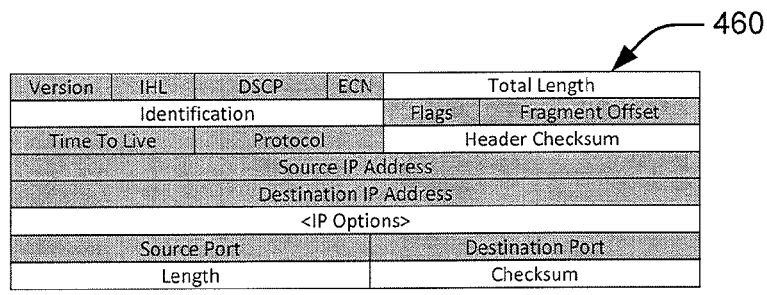
Figure 8B:
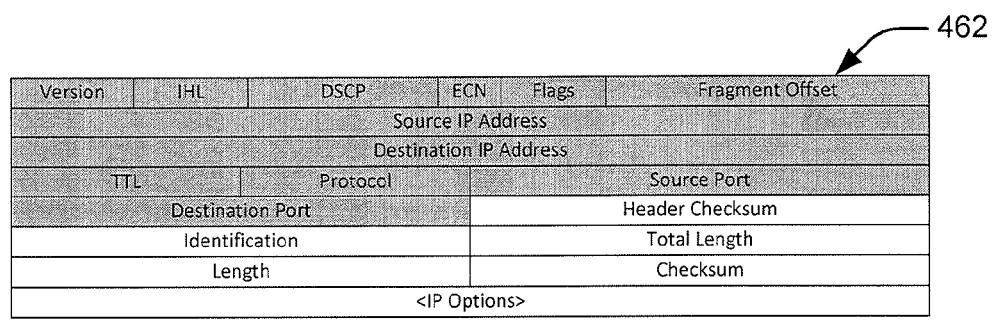
Figure 9A:
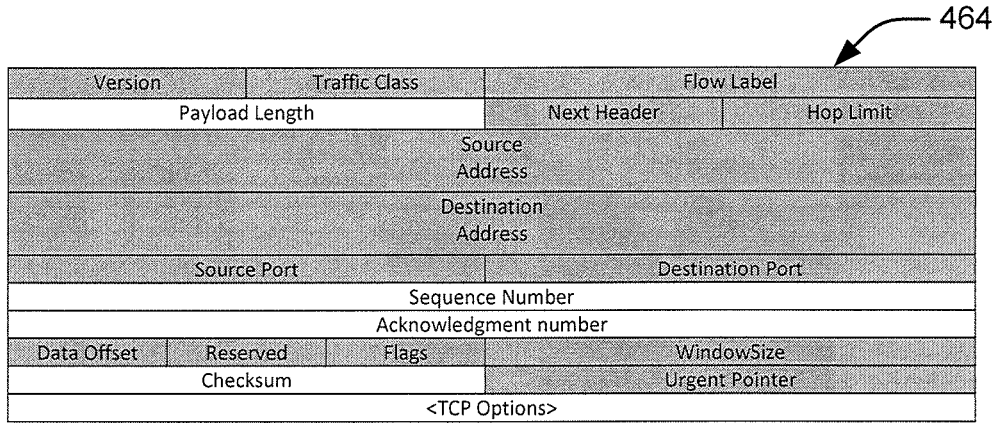
Figure 9B:
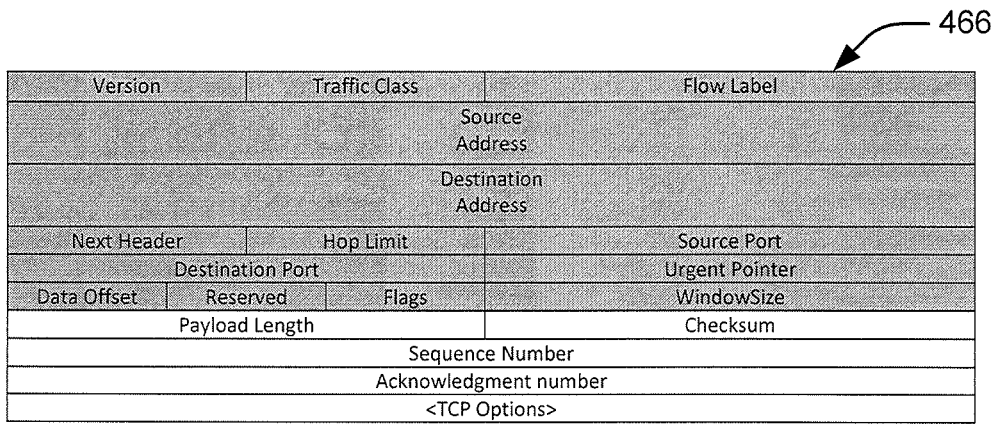
Figure 10A:
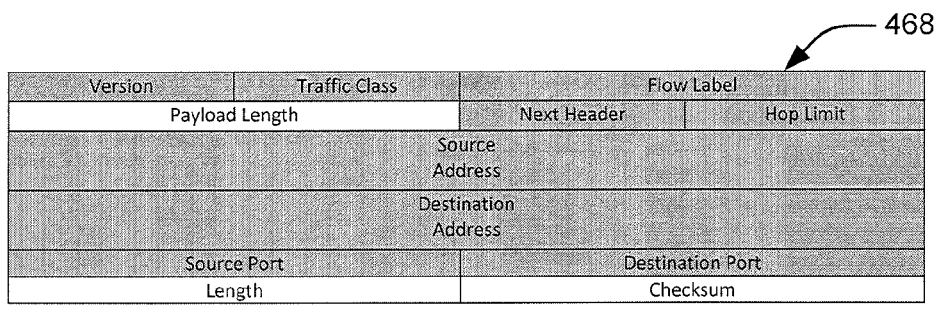
Figure 10B:
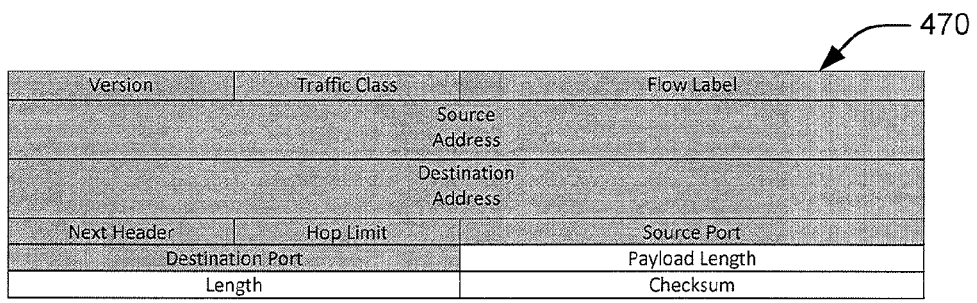

Referring to FIG. 6C, in an aspect, the transition from transmission data packet 422 to reordered transmission data packet 436 to compressed transmission data packet 448 (similar to compressed transmission data packet 212 in FIG. 3) may be represented, as described herein. For example, compressor component 144/154 may be configured to compress the reordered transmission data packet 436 after header component 148/158 performs reordering procedure on transmission data packet 422, specifically on IPV4 header 420. More particularly, compressing the reordered transmission data packet 436 comprises compressing static fields 438 and replacing the static fields with location pointer 446 (similar to location pointer 262 in FIG. 3). The compression procedure is described in more detail with regard to FIG. 3 above.

Due to the compression procedure, compressed transmission data packet 448 now comprises location pointer 446, dynamic fields 440, and body 424. Dynamic fields 440 and body 424 remain unchanged from their original states. In some instances, the IPV4 header of compressed transmission data packet 448 may comprise a byte length 454 that is less than the original byte length, header byte length 428 (FIGS. 6A and 6B) because of the compression procedure. Further, compressed transmission data packet 448 may comprise a packet byte length 450 shorter than the packet byte length 426 of both transmission data packet 422 and reordered transmission data packet 436 with a packet length difference 452. Therefore, the transmission data packet 422 will be shortened because of the reordering and compression procedures.

Additionally FIGS. 7-10 illustrate the header reordering procedure for transmission data packets in various transmission protocols. For example, FIGS. 7-10 illustrate headers 456, 460, 464, 468, and reordered headers 458, 462, 466, 470 for transmission protocols Transmission Control Protocol (TCP) over IPV4, and User Datagram Protocol (UDP) over IPV4, TCP over IPV6, and UDP over IPV6, respectively.

Figure 11:
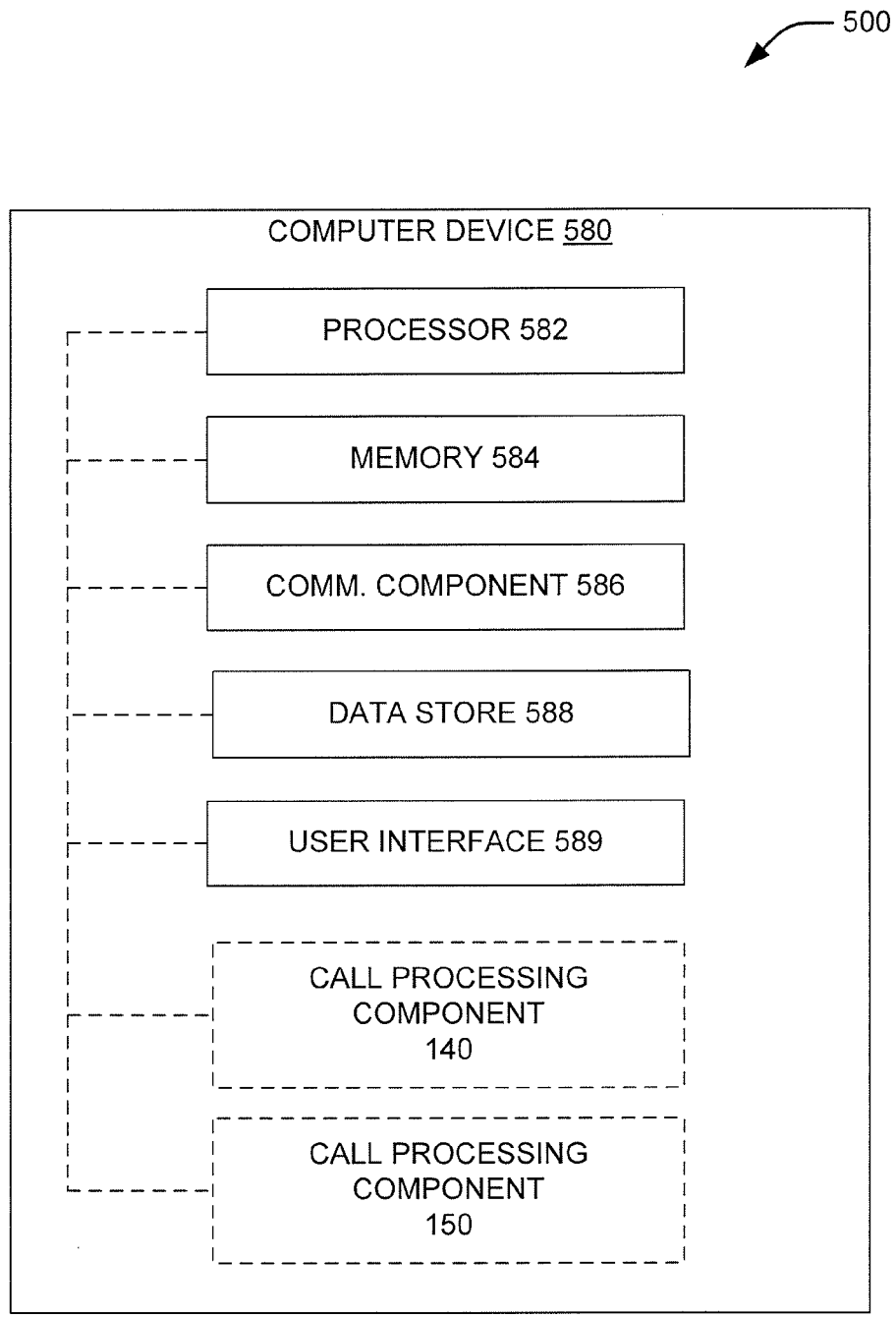
FIG. 11 is a block diagram illustrating additional example components of an aspect of a computer device having a call processing component according to the present disclosure.

Referring to FIG. 11, in one aspect, UE 114 and/or wireless serving node 116 of FIGS. 1 and/or 2 may be represented by a specially programmed or configured computer device 580 of wireless communication system 100, wherein the special programming or configuration includes call processing component 140 or call processing component 150, as described herein. For example, for implementation as UE 114 (FIG. 2), computer device 580 may include call processing component 140 for compressing a reordered header and transmitting the data from a UE 114 to network 112 via wireless serving node 116. Further for example, computer device 580 at wireless serving node 116 (FIG. 1) and/or network 112 may include call processing component 150 for compressing a reordered header and transmitting the data from wireless serving node 116 and/or network 112 to UE 114. Call processing components 140 and 150 may be specially programmed computer readable instructions or code, firmware, hardware, or some combination thereof.

Call processing components 140/150 may be implemented by processor 582 operating in conjunction with memory 584, communication component 586, data store 588, and user interface 589. Computer device 580 includes a processor 582 for carrying out processing functions associated with one or more of components and functions described herein. Processor 582 can include a single or multiple set of processors or multi-core processors. Moreover, processor 582 can be implemented as an integrated processing system and/or a distributed processing system.

Computer device 580 further includes a memory 584, such as for storing data used herein and/or local versions of applications being executed by processor 582. Memory 584 can include any type of memory usable by a computer, such as random access memory (RAM), read only memory (ROM), tapes, magnetic discs, optical discs, volatile memory, non-volatile memory, and any combination thereof.

Further, computer device 580 includes a communications component 586 that provides for establishing and maintaining communications with one or more parties utilizing hardware, software, and services as described herein. Further, Tx/Rx components 152/142 (FIG. 2) may be implemented by communication component 586 for transmitting and/or receiving data to/from network 112 via wireless serving node 116 over link 125. Communications component 586 may carry communications between components on computer device 580, as well as between computer device 580 and external devices, such as devices located across a communications network and/or devices serially or locally connected to computer device 580. For example, communications component 586 may include one or more buses, and may further include transmit chain components and receive chain components associated with a transmitter and receiver, respectively, or a transceiver, operable for interfacing with external devices. For example, in an aspect, a receiver of communications component 586 operates to receive one or more data via a wireless serving node 116, which may be a part of memory 584.

Additionally, computer device 580 may further include a data store 588, which can be any suitable combination of hardware and/or software, that provides for mass storage of information, databases, and programs employed in connection with aspects described herein. For example, data store 588 may be a data repository for applications not currently being executed by processor 582.

Computer device 580 may additionally include a user interface component 589 operable to receive inputs from a user of computer device 580, and further operable to generate outputs for presentation to the user. User interface component 589 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 589 may include one or more output devices, including but not limited to a display, a speaker, a haptic feedback mechanism, a printer, any other mechanism capable of presenting an output to a user, or any combination thereof.

Furthermore, computer device 580 may include, or may be in communication with, call processing component 140/150, which may be configured to perform the functions described herein.

Figure 12:
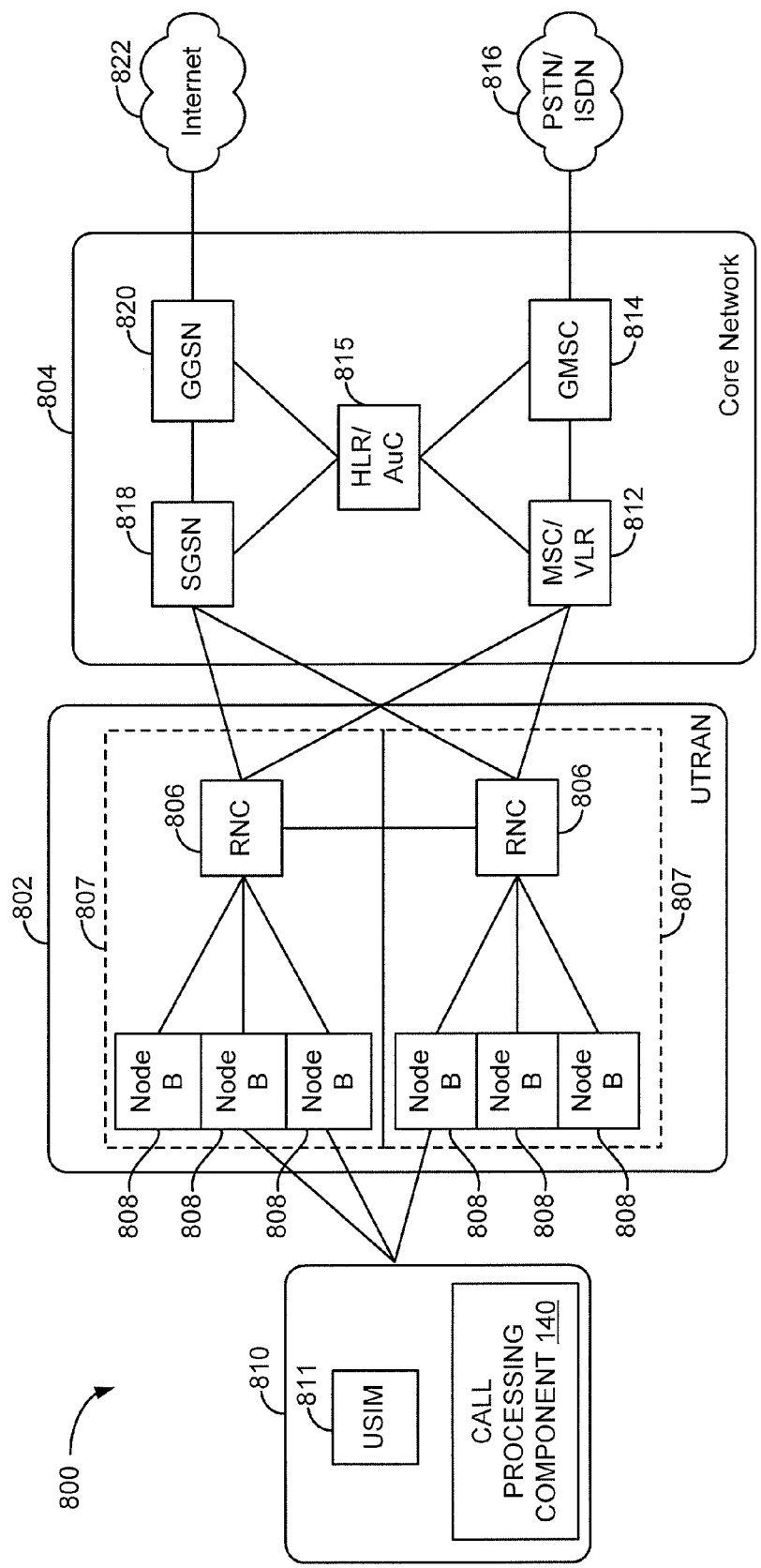
FIG. 12 is a block diagram conceptually illustrating an example of a telecommunications system including a UE configured to perform the functions described herein.

Referring to FIG. 12, by way of example and without limitation, the aspects of the present disclosure are presented with reference to a UMTS system 800 employing a W-CDMA air interface. A UMTS network includes three interacting domains: a Core Network (CN) 804, a UMTS Terrestrial Radio Access Network (UTRAN) 802, and User Equipment (UE) 810. UE 810 may be configured to include, for example, the call processing component 140/150 (FIG. 2) implementing the components described above, such as, but not limited to Tx/Rx component 142/152, compressor component 144/154, and de-compressor component 146/156, as described above. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a tablet, a wearable computing device (e.g., a smartwatch, a health or fitness tracker, etc.), an appliance, a sensor, a vending machine, or any other similar functioning device. The UE 810 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate, or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
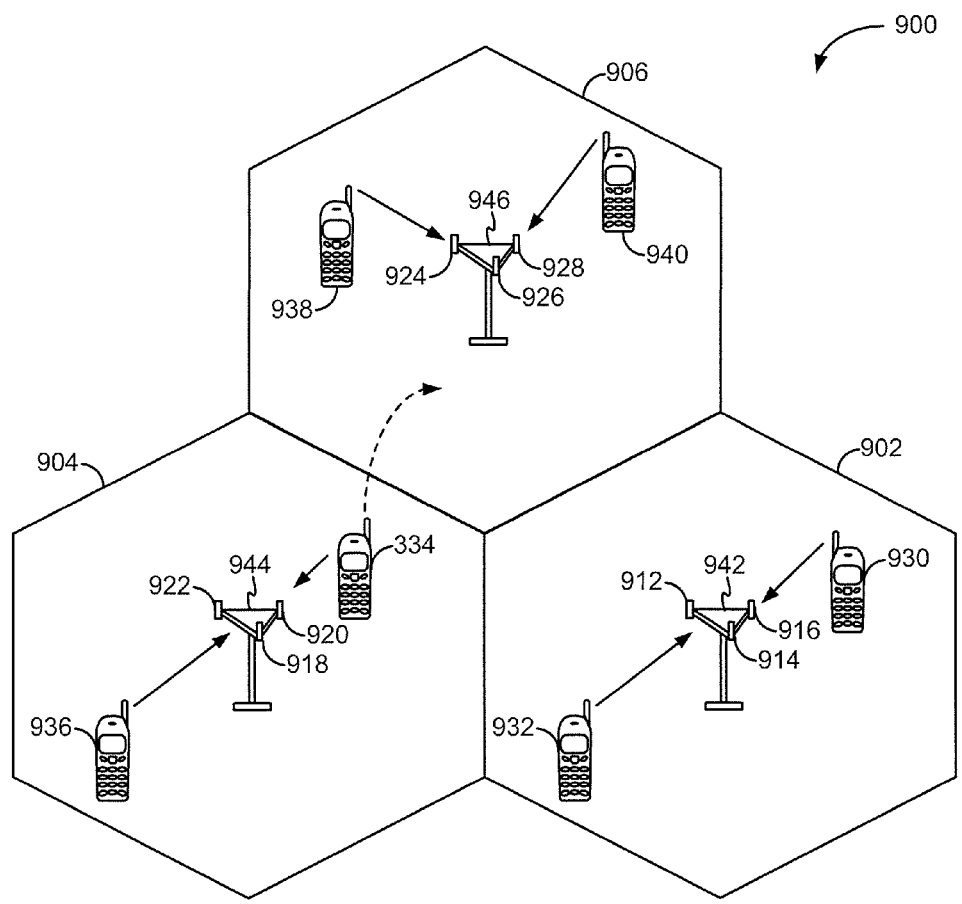
FIG. 13 is a conceptual diagram illustrating an example of an access network for use with a UE configured to perform the functions described herein.

Referring to FIG. 13, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a CN 204 (see FIG. 4) for all the UEs 930, 932, 934, 936, 938, 940 in the respective cells 902, 904, and 906. Node Bs 942, 944, 946 and UEs 930, 932, 934, 936, 938, 940 respectively may be configured to include, for example, the call processing component 140/150 (FIG. 2) implementing the components described above, such as, but not limited to Tx/Rx component 142/152, compressor component 144/154, and de-compressor component 146/156, as described above.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 206 (see FIG. 4), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 14.

Figure 14:
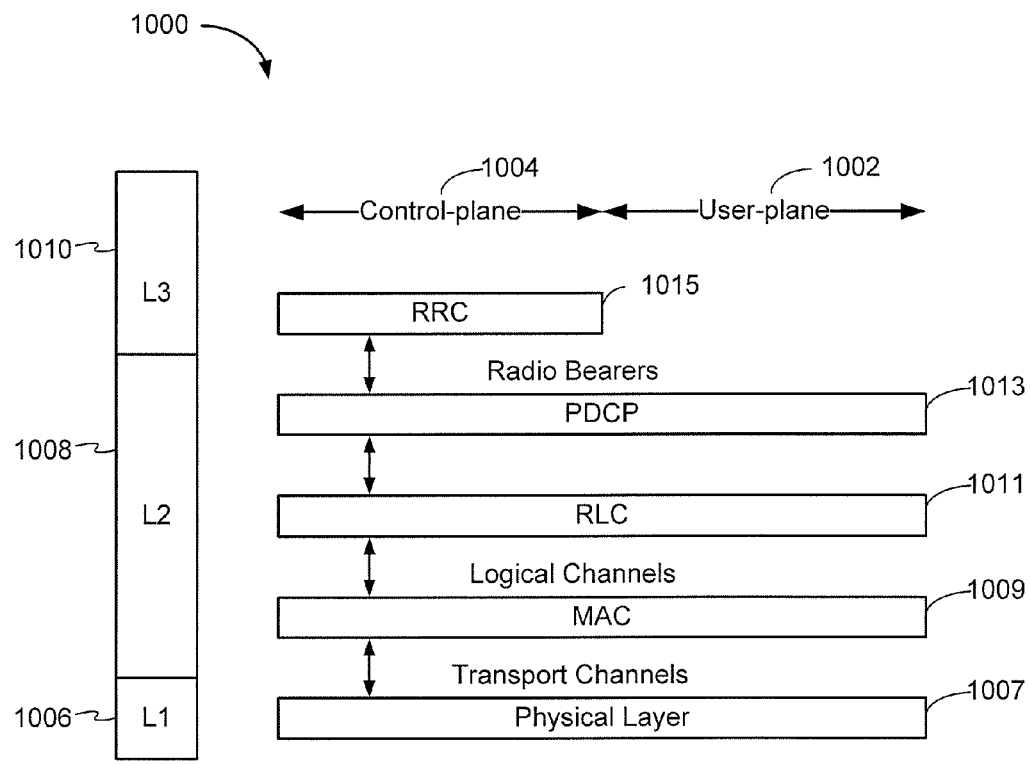
FIG. 14 is a conceptual diagram illustrating an example of a radio protocol architecture for the user and control planes for a base station and/or a UE configured to perform the functions described herein.

FIG. 14 is a conceptual diagram illustrating an example of the radio protocol architecture 1000 for the user plane 1002 and the control plane 1004 of a user equipment (UE) or node B/base station. For example, architecture 1000 may be included in a network entity and/or UE such as an entity within network 112 and/or UE 114 (FIG. 1). The radio protocol architecture 1000 for the UE and node B is shown with three layers: Layer 1 1006, Layer 2 1008, and Layer 3 1010. Layer 1 1006 is the lowest lower and implements various physical layer signal processing functions. As such, Layer 1 1006 includes the physical layer 1007. Layer 2 (L2 layer) 1008 is above the physical layer 1007 and is responsible for the link between the UE and node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 15:
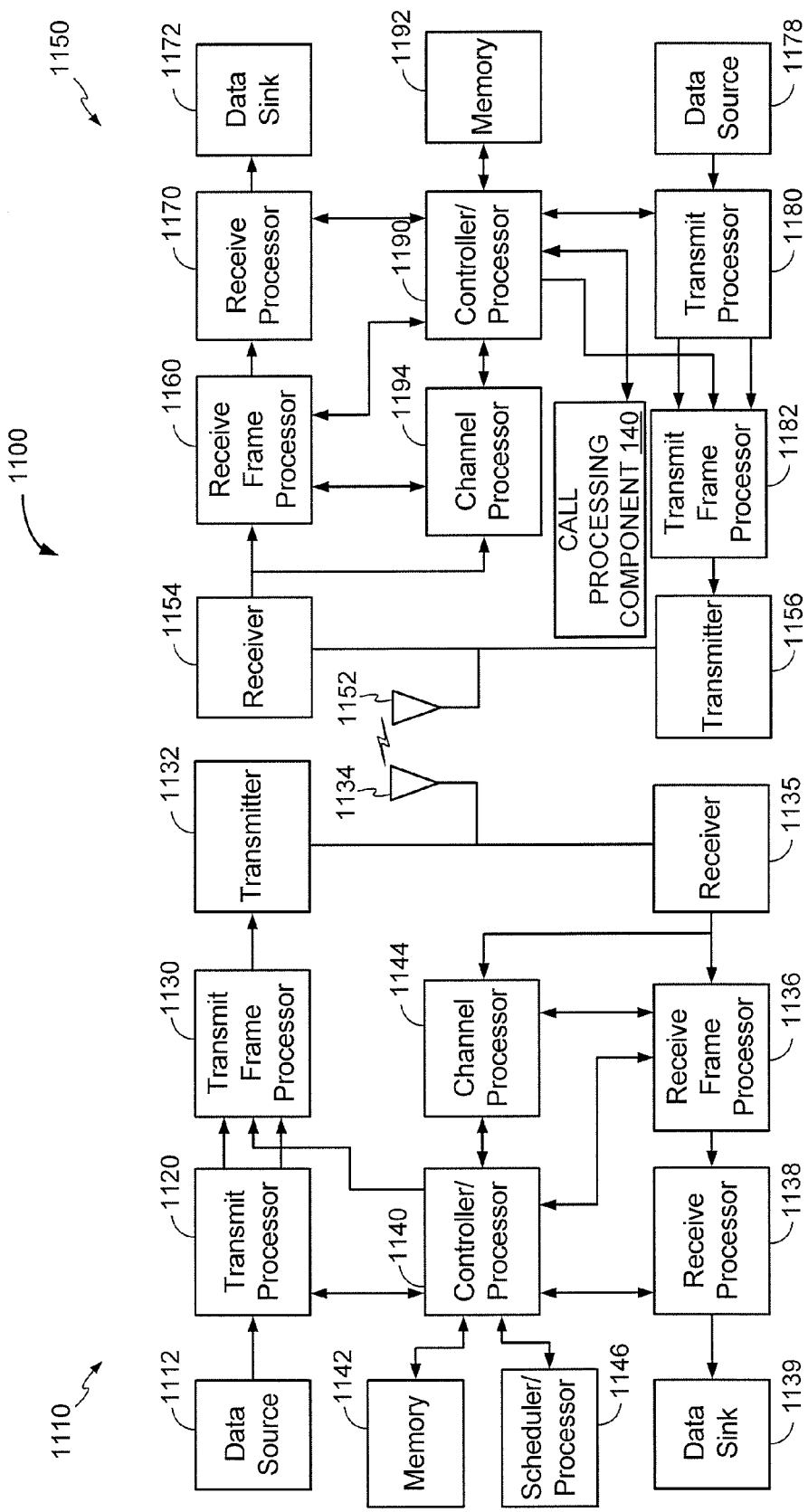
FIG. 15 is a block diagram conceptually illustrating an example of a Node B in communication with a UE in a telecommunications system configured to perform the functions described herein.

FIG. 15 is a block diagram of a communication system 1100 including a Node B 1110 in communication with a UE 1150, where Node B 1110 may be an entity within network 112 and the UE 1150 may be UE 114 according to the aspect described in FIG. 1. UE 1150 and Node B 1110 may be configured to include, for example, the call processing component 140/150 (FIG. 2) implementing the components described above, such as, but not limited to Tx/Rx component 142/152, compressor component 144/154, and de-compressor component 146/156, as described above. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE)

(in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 5 or 12) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication, comprising:
    identifying one or more static fields corresponding to fields with a high probability of not changing across a plurality of transmission data packets and one or more dynamic fields corresponding to fields with a high probability of changing across a plurality of transmission data packets within a header of a transmission data packet;
    reordering the one or more static fields and the one or more dynamic fields within the header of the transmission data packet, wherein the reordering includes grouping together the one or more static fields and the one or more dynamic fields within the header of the transmission data packet;
    compressing the transmission data packet to form a compressed transmission data packet after the reordering of the one or more static fields and the one or more dynamic fields, wherein compressing the transmission data packet to form the compressed transmission data packet includes:
        detecting a string of bytes of the transmission data packet that matches a preset string of bytes saved in a memory component;
        replacing the string of bytes of the transmission data packet that has been detected to match the preset string of bytes saved in the memory component with a location pointer, wherein after replacing the string of bytes of the transmission data packet with the location pointer, the transmission data packet comprises the location pointer and a set of literal-bytes; and
        generating the compressed transmission data packet by entropy coding the transmission data packet comprising the set of literal-bytes and the location pointer; and
    transmitting the compressed transmission data packet.

2. The method of claim 1, further comprising determining a transmission protocol of a transmission data packet.

3. The method of claim 2, wherein the one or more static fields and the one or more dynamic fields within the header of the transmission data packet are identified based at least in part on the transmission protocol of the transmission data packet.

4. The method of claim 1, wherein reordering the one or more static fields and the one or more dynamic fields within the header of the transmission data packet comprises placing the one or more static fields at a beginning of the header in response to grouping together the one or more static fields.

5. The method of claim 1, wherein reordering the one or more static fields and the one or more dynamic fields within the header of the transmission data packet comprises placing the one or more dynamic fields at an end of the header in response to grouping together the one or more dynamic fields.

6. The method of claim 1, wherein the string of bytes of the transmission data packet comprises the one or more static fields.

7. The method of claim 1, further comprising:
receiving a second compressed transmission data packet, wherein the second compressed transmission data packet is different from the compressed transmission data packet;
decompressing the second compressed transmission data packet to form a decompressed transmission data packet;
determining whether a header of the decompressed transmission data packet matches a stored header in a memory; and
reordering one or more static fields and one or more dynamic fields within the header of the decompressed transmission data packet based at least in part on determining whether the header of the decompressed transmission data packet matches the stored header.

8. The method of claim 1, further comprising:
identifying the header of the transmission data packet based on a rule that the header of the transmission data packet occupies a first number of bytes of the transmission data packet,
wherein the compressing comprises performing a header-only compression by compressing the first number of bytes of the transmission data packet.

9. A non-transitory computer-readable medium storing computer executable code for communication, comprising:
code for identifying one or more static fields corresponding to fields with a high probability of not changing across a plurality of transmission data packets and one or more dynamic fields corresponding to fields with a high probability of changing across a plurality of transmission data packets within a header of a transmission data packet;
code for reordering the one or more static fields and the one or more dynamic fields within the header of the transmission data packet, wherein the code for reordering includes code for grouping together the one or more static fields and the one or more dynamic fields within the header of the transmission data packet;
code for compressing the transmission data packet to form a compressed transmission data packet after the reordering of the one or more static fields and the one or more dynamic fields, wherein the code for compressing the transmission data packet to form the compressed transmission data packet includes:
code for detecting a string of bytes of the transmission data packet that matches a preset string of bytes saved in a memory component;
code for replacing the string of bytes of the transmission data packet that has been detected to match the preset string of bytes saved in the memory component with a location pointer, wherein after replacing the string of bytes of the transmission data packet with the location pointer, the transmission data packet comprises the location pointer and a set of literal-bytes; and code for generating the compressed transmission data packet by entropy coding the transmission data packet comprising the set of literal-bytes and the location pointer; and
code for transmitting the compressed transmission data packet.

10. An apparatus for communication, comprising:
means for identifying one or more static fields corresponding to fields with a high probability of not changing across a plurality of transmission data packets and one or more dynamic fields corresponding to fields with a high probability of changing across a plurality of transmission data packets within a header of a transmission data packet;
means for reordering the one or more static fields and the one or more dynamic fields within the header of the transmission data packet, wherein the means for reordering includes means for grouping together the one or more static fields and the one or more dynamic fields within the header of the transmission data packet;
means for compressing the transmission data packet to form a compressed transmission data packet after the reordering of the one or more static fields and the one or more dynamic fields, wherein the means for compressing the transmission data packet to form the compressed transmission data packet includes:
means for detecting a string of bytes of the transmission data packet that matches a preset string of bytes saved in a memory component;
means for replacing the string of bytes of the transmission data packet that has been detected to match the preset string of bytes saved in the memory component with a location pointer, wherein after replacing the string of bytes of the transmission data packet with the location pointer, the transmission data packet comprises the location pointer and a set of literal-bytes; and
means for generating the compressed transmission data packet by entropy coding the transmission data packet comprising the set of literal-bytes and the location pointer; and
means for transmitting the compressed transmission data packet.

11. An apparatus for communication, comprising:
a memory storing executable instructions; and
a processor in communication with the memory, wherein the processor is configured to execute the instructions to:
identify one or more static fields corresponding to fields with a high probability of not changing across a plurality of transmission data packets and one or more dynamic fields corresponding to fields with a high probability of changing across a plurality of transmission data packets within a header of a transmission data packet;
reorder the one or more static fields and the one or more dynamic fields within the header of the transmission data packet, wherein the instructions to reorder include instructions to group together the one or more static fields and the one or more dynamic fields within the header of the transmission data packet;
compress the transmission data packet to form a compressed transmission data packet after the reordering of the one or more static fields and the one or more dynamic fields, wherein the processor is further configured to:

detect a string of bytes of the transmission data packet that matches a preset string of bytes saved in a memory component;

replace the string of bytes of the transmission data packet that has been detected to match the preset string of bytes saved in the memory component with a location pointer, wherein after replacing the string of bytes of the transmission data packet with the location pointer, the transmission data packet comprises the location pointer and a set of literal-bytes; and generate the compressed transmission data packet by entropy coding the transmission data packet comprising the set of literal-bytes and the location pointer; and transmit the compressed transmission data packet.

12. The apparatus of claim 11, wherein the processor is further configured to execute the instructions to determine a transmission protocol of a transmission data packet.

13. The apparatus of claim 12, wherein the one or more static fields and the one or more dynamic fields within the header of the transmission data packet are identified based at least in part on the transmission protocol of the transmission data packet.

14. The apparatus of claim 11, wherein reordering the one or more static fields and the one or more dynamic fields within the header of the transmission data packet comprises
placing the one or more static fields at a beginning of the header in response to grouping together the one or more static fields.

15. The apparatus of claim 11, wherein reordering the one or more static fields and the one or more dynamic fields within the header of the transmission data packet comprises placing the one or more dynamic fields at an end of the header in response to grouping together the one or more dynamic fields.

16. The apparatus of claim 11, wherein the string of bytes of the transmission data packet comprises the one or more static fields.

17. The apparatus of claim 11, wherein the processor is further configured to execute the instructions to:
receive a second compressed transmission data packet, wherein the second compressed transmission data packet is different from the compressed transmission data packet;

decompress the second compressed transmission data packet to form a decompressed transmission data packet;

determine whether a header of the decompressed transmission data packet matches a stored header in a memory; and reorder one or more static fields and one or more dynamic fields within the header of the decompressed transmission data packet based at least in part on determining whether the header of the decompressed transmission data packet matches the stored header.

18. The apparatus of claim 11, wherein the processor is further configured to execute the instructions to:
identify the header of the transmission data packet based on a rule that the header of the transmission data packet occupies a first number of bytes of the transmission data packet, wherein the compressing comprises performing a header-only compression by compressing the first number of bytes of the transmission data packet.

* * * * *